(12) United States Patent
Hill

(10) Patent No.: US 9,427,693 B1
(45) Date of Patent: Aug. 30, 2016

(54) PROCESS FOR VAPOR EMISSION CONTROL

(71) Applicant: H.E.R.O., Inc., Tulsa, OK (US)

(72) Inventor: Joel Hill, Tulsa, OK (US)

(73) Assignee: H.E.R.O., Inc., Tulsa, OK (US)

( * ) Notice: Subject to any disclaimer, the term of this patent is extended or adjusted under 35 U.S.C. 154(b) by 108 days.

(21) Appl. No.: 14/514,982

(22) Filed: Oct. 15, 2014

(51) Int. Cl.
   *B01D 53/04* (2006.01)
   *B01D 53/047* (2006.01)

(52) U.S. Cl.
   CPC ............ *B01D 53/0423* (2013.01); *B01D 53/04* (2013.01); *B01D 53/0476* (2013.01); *B01D 2256/245* (2013.01); *B01D 2257/702* (2013.01)

(58) Field of Classification Search
   CPC .............. B01D 53/04; B01D 53/0423; B01D 53/0476; B01D 2256/245; B01D 2257/702
   USPC ............... 95/96, 101, 102, 143; 96/121, 132
   See application file for complete search history.

(56) References Cited

U.S. PATENT DOCUMENTS

| | | |
|---|---|---|
| 3,714,790 A | 2/1973 | Battey |
| 3,771,317 A | 11/1973 | Nichols |
| 3,947,258 A | 3/1976 | Decker |
| 3,972,201 A | 8/1976 | Datis |
| 4,066,423 A | 1/1978 | McGill et al. |
| 4,261,716 A | 4/1981 | Schwartz et al. |
| 4,276,058 A | 6/1981 | Dinsmore |
| 4,331,456 A | 5/1982 | Schwartz et al. |
| 4,338,101 A | 7/1982 | Tuttle |
| 4,737,167 A * | 4/1988 | Ohtani ............... B01D 53/0476 95/102 |
| 5,012,037 A * | 4/1991 | Doshi ....................... C07C 7/12 208/103 |
| 5,154,735 A | 10/1992 | Dinsmore et al. |
| 5,176,002 A | 1/1993 | O'Brien et al. |
| 5,426,945 A | 6/1995 | Menzenski |
| 5,591,254 A | 1/1997 | Gibson |
| 5,671,612 A | 9/1997 | Menzenski |
| 5,681,369 A | 10/1997 | Osborne |
| 5,765,395 A | 6/1998 | Menzenski |
| 5,853,455 A | 12/1998 | Gibson |
| 5,871,568 A | 2/1999 | Gibson |
| 5,914,455 A * | 6/1999 | Jain .................... B01D 53/0462 95/106 |
| 6,752,851 B2 * | 6/2004 | Kawai .................. B01D 53/047 95/119 |

* cited by examiner

*Primary Examiner* — Frank Lawrence
(74) *Attorney, Agent, or Firm* — Molly D. McKay

(57) ABSTRACT

A vapor emission control system for recovering hydrocarbon vapors displaced as vessels are loading consisting of two stages of carbon adsorption vapor recovery units. The first stage with two or more parallel carbon beds recovers the heavier C4-C6+ hydrocarbons on a first carbon bed which are then removed as a gas via vacuum and then converted into a liquid product via a vapor-to-liquid conversion unit. Lighter C2-C3 hydrocarbon vapor discharged from the first stage is recovered on two or more parallel carbon beds of the second stage. The vapor is then removed via vacuum as a concentrated gas for use as fuel or sent to a flare. The hydrocarbon lean first portion of the off-gas from each vacuum desorption is recycled to the other in-parallel carbon bed. The load and regeneration cycles alternate for the two carbon beds in each of the two stages based on an optimized time cycle.

4 Claims, 2 Drawing Sheets

PROCESS FOR VAPOR EMISSION CONTROL

BACKGROUND OF THE INVENTION

1. Field of the Invention

The present invention relates to a process and system for treating crude oil vapors such as those produced from crude oil loading or any hydrocarbon vapor comprised of light hydrocarbons in the range of C2-C3, i.e. ethane and propane and derivative hydrocarbons, and heavy hydrocarbons in the range of C4-C6 and greater, i.e. butane, butane derivative hydrocarbons, and heavier hydrocarbons.

2. Description of the Related Art

When loading crude oil or other hydrocarbons containing light hydrocarbons in the range of C2-C3 and heavy hydrocarbons in the range of C4-C6 and greater onto a tank truck or tanker vessel, some of the light and heavy hydrocarbons vaporize. These vapors may be initially treated to remove such things as sulfur and those vapors that will condense to a liquid when cooled are recovered as a liquid. From that point, the remaining vapor which contains a large amount of light and heavy hydrocarbons must be treated before venting.

For safety and environmental reasons, venting of hydrocarbons is often accomplished through a flare or other combustion device which burns the hydrocarbons. However, burning of hydrocarbons produces carbon dioxide, i.e. a greenhouse gas, and other pollutants. Thus the practice of burning the hydrocarbons through a flare or other combustion device is environmentally undesirable. Also, burning of the hydrocarbons wastes valuable resources which might otherwise be recovered for use as fuel or as a salable product.

Currently hydrocarbon vapor recovery systems consist of passing the vapors through an activated carbon bed. Activated carbon attracts hydrocarbon material on its surface, with a higher preference for adsorbing the heavy hydrocarbons in the range of C4-C6 and greater. Thus, the activated carbon bed will selectively adsorb most of the heavy hydrocarbons in the range of C4-C6 and greater. The light hydrocarbons in the range of C2-C3 will generally pass through the activated carbon bed which has already adsorbed on it heavy hydrocarbons, and those light hydrocarbons will be vented to atmosphere or be vented to a flare to be burned.

Once the carbon bed is loaded with hydrocarbons during the adsorption phase, it is then taken off line and regenerated by subjecting it to a vacuum. The hydrocarbons that were adsorbed onto the carbon bed will be drawn off by the vacuum and the discharge from the vacuum pump will next be transferred to the inlet of a liquid contact absorption unit. Within the liquid contact absorption unit, the vapor will pass through a liquid hydrocarbon shower, such as for example gasoline, where the gaseous hydrocarbons will be absorbed in the liquid hydrocarbons, thereby increasing the amount of liquid hydrocarbons exiting the unit. This recovers much of the heavy hydrocarbons in the range of C4-C6 and greater.

However, even though this type of treatment does recover much of the heavy hydrocarbons in the range of C4-C6 and greater, most of the light hydrocarbons in the range of C2-C3 pass through the carbon bed without being adsorbed and are either vented to atmosphere or are vented to a flare where they are burned. Both options provide no benefit or profit to the operation and both venting and flaring create environmentally undesirable situations.

The present invention addresses this problem by providing a two stage carbon bed adsorption system consisting of a first carbon bed adsorption unit and a second carbon bed adsorption unit in series with the first one. The first stage carbon bed adsorption unit removes the heavy hydrocarbons in the range of C4-C6 and greater, and the vapor discharged from the first stage carbon bed adsorption unit is then passed through a second stage carbon bed adsorption unit where the light hydrocarbons in the range of C2-C3 are removed from the remaining gaseous components of the vapor before the vapor is then discharged to atmosphere. The second stage vapor contains minimal heavy hydrocarbons which improves the working capacity for the light hydrocarbons.

During regeneration of the first stage carbon bed, the heavy hydrocarbons in the range of C4-C6 and greater are drawn off in the discharge from a vacuum pump and are subjected to further treatment to liquefy them so that they can be recovered as a liquid product for storage.

During regeneration of the second stage carbon bed, the light hydrocarbons in the range of C2-C3 are drawn off in the discharge from a second vacuum pump as a gaseous vapor containing a rich concentration of hydrocarbons which can be used as fuel gas for facility operations.

SUMMARY OF THE INVENTION

This vapor emission control system is designed to recover vapors produced from crude loading or loading of any hydrocarbon vapor comprised of light hydrocarbons in the range of C2-C3 and heavy hydrocarbons in the range of C4-C6 and greater. Vapors are displaced from loading liquids into vessels and brought through a vapor line and recovered in two stages of carbon adsorption vapor recovery units. The first stage recovers the heavier hydrocarbons on a first stage carbon bed which are then removed via vacuum from the first stage carbon bed as a gas and then the gas is converted into a liquid using compression and cooling or alternately using absorption or refrigeration. The second stage recovers the light ends on a second stage carbon bed which are then removed via vacuum from the second stage carbon bed as a concentrated gas for use as fuel in a boiler or other device.

The vacuum regenerated hydrocarbons from the first stage are sent to a vapor-to liquid conversion unit, which could be a compressor and then a cooler, to convert them into a liquid form for storage. Alternately, the vapor-to liquid conversion unit may be a refrigeration system or a liquid absorption unit. The liquid is then available for fuel or blending into other hydrocarbon streams which are compatible. The recovered hydrocarbons from the second stage remain as vapors and are sent directly as a gaseous fuel as they are produced. The load and regeneration cycles alternate for the two carbon beds in each of the stages and these beds switch based on an optimized time cycle.

DETAILED DESCRIPTION OF THE PREFERRED EMBODIMENT

Figure 2:
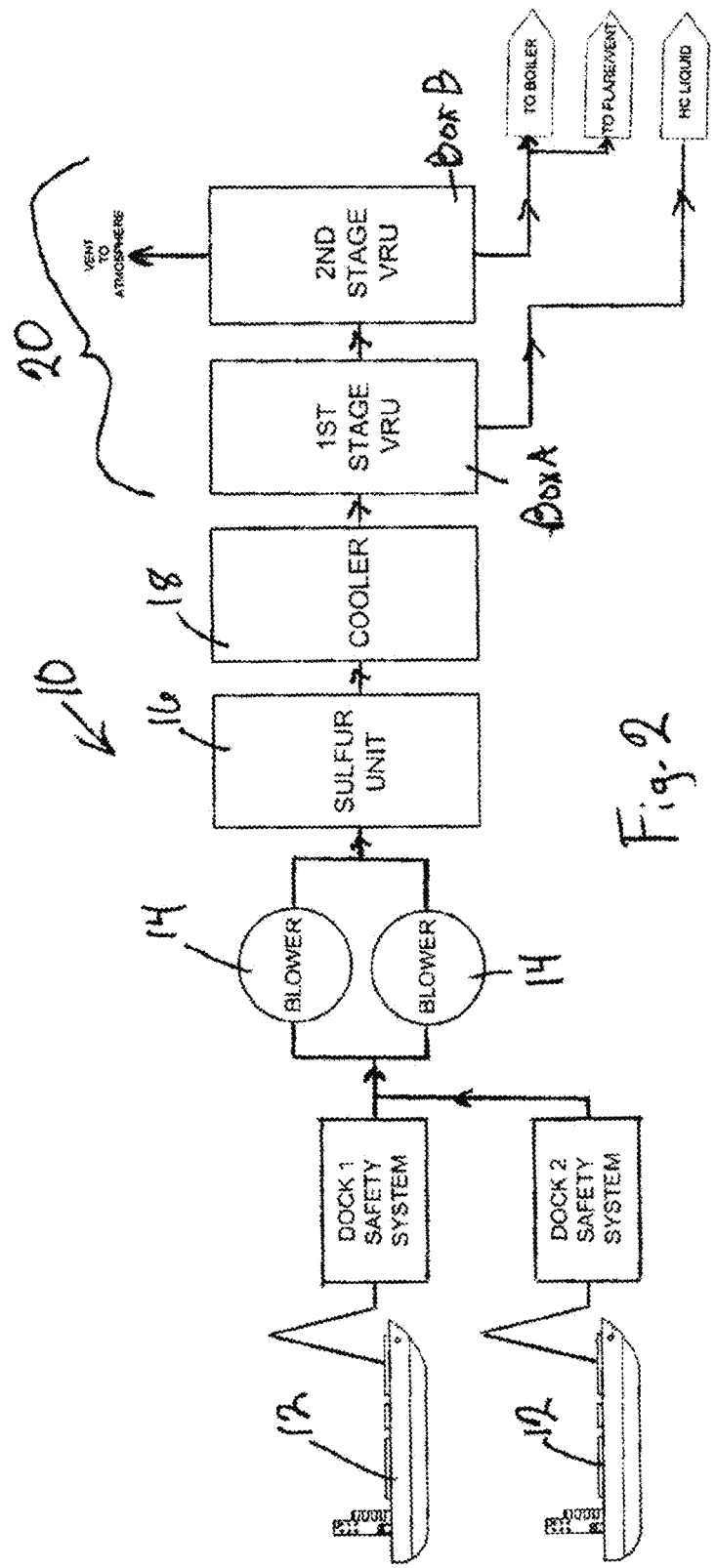
FIG. 2 is a diagram of the vapor emissions control system of FIG. 1 shown installed in a typical tanker vessel loading operation.

Referring now to the drawings and initially to FIG. 2, there is illustrated a typical tanker vessel loading operation 10 that is employing a vapor emissions control system 20 constructed in accordance with a preferred embodiment of the present invention. As shown, the system 20 receives vapors produced when crude oil or other similar hydrocarbon is being loaded onto a vessel 12.

The hydrocarbon vapor contains light hydrocarbons in the range of C2-C3 and heavy hydrocarbons in the range of C4-C6 and greater. The vapor is typically pushed by blowers 14 through initial sulfur pre-treatment units 16 to remove sulfur and through cooling pretreatment units 18 for cooling the vapor to a desired temperature for treatment in the first and second stage carbon beds 22 and 24 that are a part of the vapor emissions control system 20 as will be more fully described hereafter.

Although the drawings illustrate a typical installation, it should be noted that the invention is not so limited and may be employed to treat any vapor where it is desirable to extract and recover from the vapor the lighter hydrocarbons in the range of C2-C3 and the higher hydrocarbons in the range of C4-C6 and greater.

Figure 1:
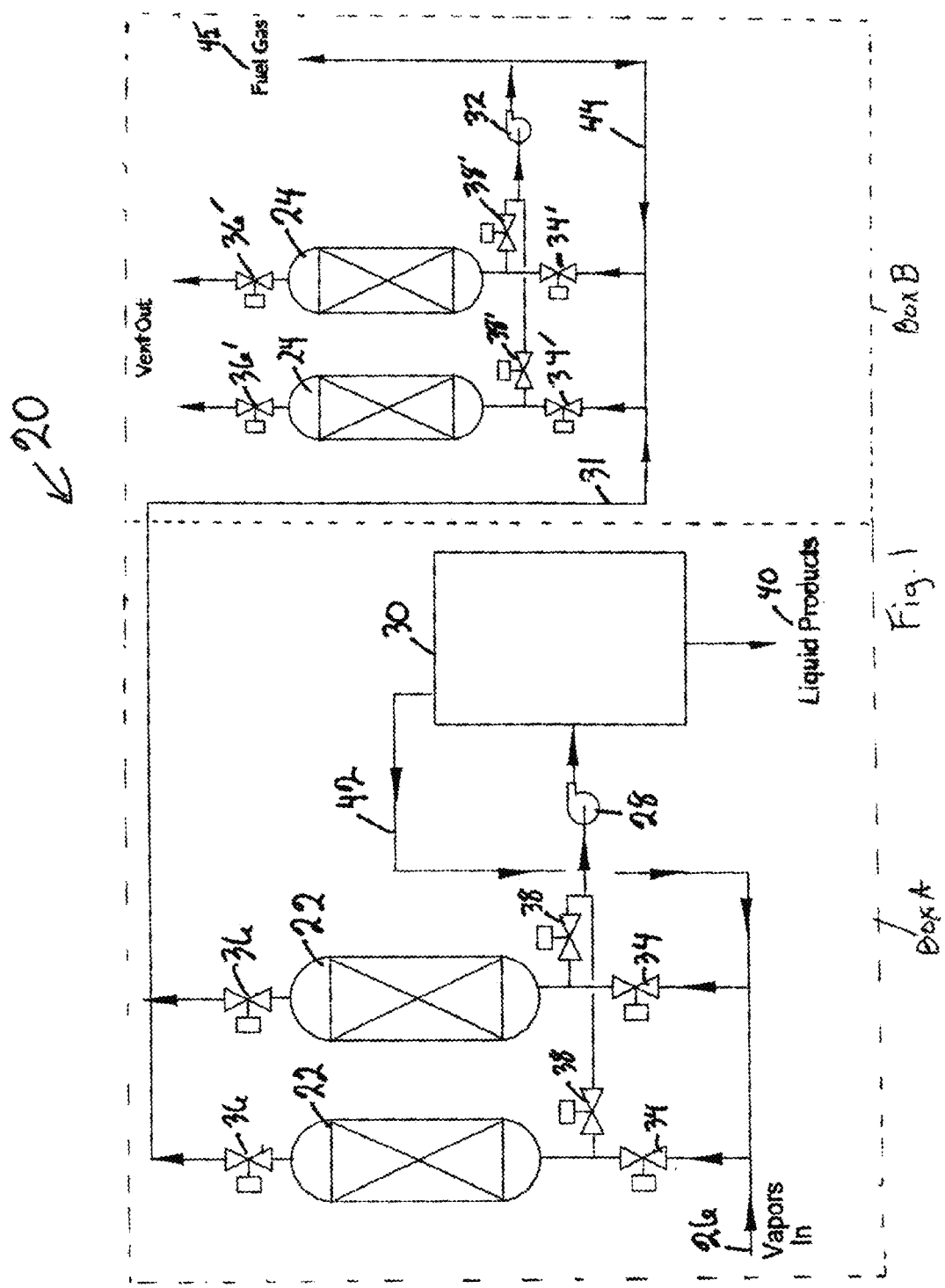
FIG. 1 is a diagram of vapor emissions control system that is constructed in accordance with a preferred embodiment of the present invention.

Referring now to FIG. 1, the vapor emissions control system 20 is shown in more detail. Vapors displaced from loading hydrocarbon liquids into vessels 12 are brought through a vapor inlet line 26 and recovered in two stages of carbon adsorption vapor recovery units which are depicted in FIG. 1 as being those items located within Box A and within Box B, respectively. The first stage, as illustrated in Box A, recovers the heavier hydrocarbons on one of two first stage carbon beds 22 that are arranged in parallel. Although only two first stage carbon beds 22 are illustrated and described, it is understood that more than two first stage carbon beds 22 may be employed. The heavier hydrocarbons are then removed from the first stage carbon bed 22 via a first stage vacuum pump or vacuum system 28 as a gas. The gas is then converted into a liquid in a liquid conversion unit 30.

The liquid conversion unit 30 may be any type of equipment that will convert the gaseous hydrocarbons to a liquid form, such as using compression and cooling, refrigeration, using absorption, or any other effective means of converting the gaseous hydrocarbons to a liquid form. FIG. 1 shows two first stage carbon beds 22 that are installed in parallel so that one first stage bed 22 is being regenerated while the other first stage bed 22 is in adsorptive service.

The second stage, as illustrated in Box B, receives vapor discharged from the first stage carbon beds 22 via a second stage vapor inlet line 31. The second stage vapor inlet line 31 supplies vapor to both of the second stage carbon beds 24. Again, although only two second carbon beds 24 are illustrated and described, it is to be understood that more than two second stage carbon beds 24 may be employed. The light ends contained in the vapor are recovered on one of two second stage carbon beds 24. The light ends are then removed from the second stage carbon bed 24 via a second vacuum pump or vacuum system 32 as a concentrated gas for use as fuel in a boiler or flare. FIG. 1 shows two second stage carbon beds 24 that are installed in parallel as one second stage carbon bed 24 is being regenerate while the other second stage carbon bed 24 is in service.

Although only one first stage vacuum pump 28 is described and illustrated and only one second vacuum pump 32 is described and illustrated, the invention is not so limited and more than one first stage vacuum pump 28 and more than one second stage vacuum pump 32 may be employed.

The vacuum regenerated hydrocarbons from the first stage carbon beds 22 are sent to a vapor-to-liquid conversion unit 30, which is normally a compressor and a cooler, to convert them into a liquid form for storage. Alternately, the vapor-to-liquid conversion unit may be a refrigeration unit, a liquid absorption unit, or any type of unit that is capable of converting to a liquid the hydrocarbon vapors generated by the first stage carbon beds 22 and first stage vacuum pump system 28. The liquid is then available for fuel or blending into other hydrocarbon streams which are compatible.

The recovered hydrocarbons from the second stage remain as vapors and are sent directly to an industrial application within the facility as a gaseous fuel as they are produced. The load and regeneration cycles alternate for the two carbon beds 22 in the first stage and also for the two carbon beds 24 in the second stage, with each set of beds 22 and 24 being switch based on an optimized time cycle.

In operation, vapors flow into the first stage vapor recovery unit (which is shown in Box A) and are sent to one of the in-parallel first stage carbon beds 22. One of the first stage beds 22 can be adsorbing vapors while the other first stage bed 22 undergoes vacuum regeneration. Inlet valve 34 and outlet valve 36 are open to the bed 22 that is in the adsorption phase and a vacuum regeneration valve 38 is closed for that bed 22. The other bed 22 is vacuum regenerated by closing the inlet and outlet valves 34 and 36 for that bed 22 and opening the vacuum regeneration valve 38 to the first stage vacuum pump 28.

The heavier hydrocarbons are captured in the first stage beds 22 and the lighter hydrocarbons pass through with the air and or other inert gasses onto the second stage beds 24. Although not illustrated, when a regenerated bed 22 or 24 is under deep vacuum, a purge valve opens to improve the regeneration. When regeneration is complete, the carbon beds 22 or 24 are slowly re-pressurized back to atmospheric pressure using outlet vapor from the bed 22 or 24 that is undergoing the adsorption phase. Re-pressurization can be accomplished with outlet valves 36 or other separate valves, not illustrated.

The first stage vacuum pump system 28 pulls the regenerated hydrocarbon vapors from the first carbon bed 22 undergoing regeneration and the second stage vacuum pump system 32 pulls the regenerated hydrocarbon vapors from the second stage carbon bed 24 undergoing regeneration. Hydrocarbon vapors which exit the first stage vacuum pump are sent to a vapor-to-liquid conversion unit 30 which could be a compressor and a cooler where the rich vapors are compressed to high pressure and cooled to condense them to a liquid. The compressor discharge is cooled in a cooler and any liquid condensed is removed and collected in a separator, as shown on the chart as "Liquid Products" 40. Liquid condensate light ends can be used for many purposes or may be sold.

The majority of the heavier hydrocarbons is removed in the first stage vapor recovery unit and can be sent to a storage tank as a liquid. There still are appreciable light ends, i.e. ethane and propane, which exit the first stage but still need to be removed. The second stage is designed to capture the remaining light ends, concentrate them up to a richer stream while allowing the non-hydrocarbon air and or inert gases to exit the second stage beds 24.

The second stage carbon beds 24 operate similar to the first stage carbon beds 22 with adsorption of light hydrocarbons while the non-hydrocarbons exit the beds and are vented out to atmosphere.

One of the second stage beds 24 can be adsorbing vapors while the other second stage bed 24 undergoes vacuum regeneration. Inlet valves 34' and outlet valve 36' are open to the bed 24 that is in the adsorption phase and a vacuum regeneration valve 38' is closed for that bed 24. The other bed 24 is vacuum regenerated by closing the inlet and outlet valves 34' and 36' for that bed 24 and opening the vacuum regeneration valve 38' to the second stage vacuum pump system 32.

Regeneration of the second stage carbon beds 24 is done with a second stage vacuum pump system 32 for removal of the hydrocarbons from the second stage carbon beds 24 in a similar manner to the functioning of the first stage vacuum pump 28. This produces a rich gaseous hydrocarbon stream or fuel gas 45. In order to produce a richer hydrocarbon stream, a first or initial portion of the gas produced by the second stage vacuum pump 32 when regenerating a second stage carbon bed 24 is recycled to the other second carbon bed 24 which is on line and is taking vapors. A second or final portion of vacuum regenerated gas produced by the second stage vacuum pump system 32 is produced upon reaching deep vacuum and is rich, containing little oxygen or nitrogen. This final portion of hydrocarbon rich gaseous stream 45 can be used to fire boilers or any other fuel-consuming device at the facility. There may be times when the fuel gas 45 generated is excessive, and must be disposed of in a standby flare. This flare could also be used when fuel quality of the fuel gas 45 is unacceptable or when other problems occur.

For safety reasons and for cooling, liquid ring vacuum pumps are preferably used for the first and second stage vacuum pump systems 28 and 32, but the invention is not so limited. Although not illustrated, the liquid coolant from the vacuum pump systems 28 and 32 is recovered in a separator and the vapors are treated downstream. Liquid ring vacuum pumps are employed in the pump systems 28 and 32 and those pumps preferably use ethylene glycol as a coolant and an evaporative cooler is used to remove the heat generated by the recycled glycol. The recycled glycol is cooled by an evaporative cooler prior to re-use.

One key to the process is the proper handling of the initial portion of vacuum pull down material produced by the first and second stage vacuum pump systems 28 and 32 from both the first and the second stages which may not be rich enough to operate processes. The first portion of the vapor removed from either stage will contain more air and/or other inert gases than can be processed effectively by the recovery equipment downstream. The first portion of vapor is directly recycled back to the other bed in that stage during its adsorption step. In the first stage, the first portion of vapor is recycled to the other bed 22 via recirculation line 42, and in the second stage, the first portion of vapor is recycled to the other bed 24 via recirculation line 44.

When the vacuum level is deep enough to produce a rich hydrocarbon vapor, those richer vapors are sent into the recovery conversion portion of the system 20. Richer vapor for the first stage are sent to the vapor-to-liquid conversion unit 30 such as a compression/cooling loop for liquefaction of the hydrocarbons or alternately to a unit for absorption by a suitable liquid. The second stage richer vapors in a fuel gas 45 that are rich enough to burn in a fuel consuming device such as a boiler.

By bypassing the first portion of the vacuum regenerated vapor in both the first and second stages, the downstream processing portion is smaller with lower capital and operating costs. By processing only the rich vapor portion of the regenerated vapor, more efficient operations are obtained.

Although the invention has been described and illustrated as being used in association with tanker ship loading, the invention is not so limited. The invention may be used in any application where a vapor contains light and heavy hydrocarbons that are to be removed and recovered from the vapor.

While the invention has been described with a certain degree of particularity, it is manifest that many changes may be made in the details of construction and the arrangement of components without departing from the spirit and scope of this disclosure. It is understood that the invention is not limited to the embodiments set forth herein for the purposes of exemplification, but is to be limited only by the scope of the attached claim or claims, including the full range of equivalency to which each element thereof is entitled.

What is claimed is:

1. A vapor emission control system to recover vapors produced from hydrocarbon loading comprising:
    a vapor inlet line attached to a first stage carbon adsorption vapor recovery unit to feed hydrocarbon vapors to the unit, said first stage carbon adsorption vapor recovery unit provided with at least two first stage carbon beds installed in parallel for adsorbing hydrocarbons from the hydrocarbon vapors fed to them by the vapor inlet line, each said first stage carbon beds connected to at least one first vacuum pump system for removing gaseous hydrocarbons that are liquefiable at atmospheric pressure from the first stage carbon beds, each said first vacuum pump system connected to a vapor-to-liquid conversion unit for converting gaseous hydrocarbons to liquid hydrocarbon product,
    a second stage carbon adsorption vapor recovery unit connected to said first stage carbon beds to receive vapor discharged from the first stage carbon beds, said second stage carbon adsorption vapor recovery unit provided with at least two second stage carbon beds installed in parallel for adsorbing hydrocarbons that are non-liquefiable at atmospheric pressure from the vapor discharged from the first stage carbon beds, each said second stage carbon beds connected to at least one second vacuum pump system for removing gaseous hydrocarbons that are non-liquefiable at atmospheric pressure from the second stage carbon beds, and
    said at least one second vacuum PUMP system discharging the gaseous hydrocarbons that are not non-liquefiable at atmospheric pressure for use as fuel gas.

2. A vapor emission control system to recover vapors produced from hydrocarbon loading according to claim 1 further comprising:
    separate inlet valves connecting each of said first stage carbon beds to said vapor inlet line, separate outlet valves connecting each of said first stage carbon beds to a second stage vapor inlet line supplying vapor to said second stage carbon beds, separate vacuum regeneration valves connecting each of said first stage carbon beds to said first vacuum pump system,
    separate inlet valves connecting each of said second stage carbon beds to said second stage vapor inlet line, separate outlet valves connecting each of said second stage carbon beds to vent, separate vacuum regeneration valves connecting each of said second stage carbon beds to said second vacuum pump system, and
    said second vacuum pump system connected to a fuel gas supply line.

3. A process for controlling vapor emissions comprising:
    passing a hydrocarbon containing vapor stream through first stage carbon beds to adsorb heavier hydrocarbons onto the beds and produce a partially extracted hydrocarbon stream,
    applying a vacuum to the first stage carbon beds to remove hydrocarbons as a gaseous hydrocarbon stream from the first stage carbon beds, converting the gaseous hydrocarbon stream into a liquid hydrocarbon product, passing the partially extracted hydrocarbon stream through second stage carbon beds to adsorb lighter hydrocarbons onto the beds and venting the fully extracted hydrocarbon stream to atmosphere, applying a vacuum to the second stage carbon beds to remove hydrocarbons as a second gaseous hydrocarbon stream from the second stage carbon beds, and discharging the second gaseous hydrocarbon stream which can be used for fuel gas.

4. A process for controlling vapor emissions comprising:

passing a hydrocarbon containing vapor stream through first stage carbon beds to adsorb heavier hydrocarbons onto the beds and produce a partially extracted hydrocarbon stream, applying a vacuum to the first stage carbon beds to remove hydrocarbons as a gaseous hydrocarbon stream from the first stage carbon beds, converting the gaseous hydrocarbon stream into a liquid hydrocarbon product, passing the partially extracted hydrocarbon stream through second stage carbon beds to adsorb lighter hydrocarbons onto the beds and venting the fully extracted hydrocarbon stream to atmosphere, applying a vacuum to the second stage carbon beds to remove hydrocarbons as a gaseous hydrocarbon stream from the second stage carbon beds which can be used for fuel, recycling to the other first stage carbon bed a first portion of lean gaseous hydrocarbon stream initially removed when applying vacuum to one of the first stage carbon beds, and recycling to the other second stage carbon bed a first portion of lean gaseous hydrocarbon stream initially removed when applying vacuum to one of the second stage carbon beds.

* * * * *